US010562604B2

(12) United States Patent
Guering

(10) Patent No.: US 10,562,604 B2
(45) Date of Patent: Feb. 18, 2020

(54) SYSTEM FOR HOLDING A FORWARD PRESSURE BULKHEAD VIA NON-PARALLEL RODS ATTACHED TO THE FLOOR

(71) Applicant: Airbus Operations SAS, Toulouse (FR)

(72) Inventor: Bernard Guering, Montrabe (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 422 days.

(21) Appl. No.: 15/375,478

(22) Filed: Dec. 12, 2016

(65) Prior Publication Data

US 2017/0166291 A1    Jun. 15, 2017

(30) Foreign Application Priority Data

Dec. 11, 2015    (FR) .................................... 15 62240

(51) Int. Cl.
*B64C 1/10*    (2006.01)
*B64C 1/18*    (2006.01)
*B64C 1/06*    (2006.01)
*B64C 1/36*    (2006.01)

(52) U.S. Cl.
CPC ............... *B64C 1/10* (2013.01); *B64C 1/064* (2013.01); *B64C 1/18* (2013.01); *B64C 1/36* (2013.01)

(58) Field of Classification Search
CPC .......... B64C 1/06; B64C 1/068; B64C 1/069; B64C 1/10; B64C 1/18; B64C 1/36; H01Q 1/281
USPC ........................................... 244/119; 52/166
See application file for complete search history.

(56) References Cited

U.S. PATENT DOCUMENTS

| 5,899,412 | A  | * | 5/1999 | Dilorio | ..................... | B64C 1/10 |
|---|---|---|---|---|---|---|
|  |  |  |  |  |  | 244/119 |
| 7,338,013 | B2 | * | 3/2008 | Vetillard | ................... | B64C 1/18 |
|  |  |  |  |  |  | 244/117 R |
| 7,475,850 | B2 | * | 1/2009 | Vetillard | ................... | B64C 1/18 |
|  |  |  |  |  |  | 244/117 R |
| 8,177,166 | B2 | * | 5/2012 | Haack | ..................... | B64C 1/068 |
|  |  |  |  |  |  | 244/119 |
| 9,376,200 | B2 | * | 6/2016 | Durand | ..................... | B64C 1/36 |

(Continued)

FOREIGN PATENT DOCUMENTS

EP      1614625      1/2006
FR      2983825      6/2013

(Continued)

OTHER PUBLICATIONS

French Search Report, dated Jul. 27, 2016, priority document.

*Primary Examiner* — Richard R. Green
(74) *Attorney, Agent, or Firm* — Greer, Burns & Crain, Ltd.

(57) ABSTRACT

A zone is provided between the forward pressure bulkhead in an aircraft and the floor. The nose section of the aircraft in which the flat surface pressure bulkhead including at least one transverse frame comprises at least two rods, of which one of the front ends is attached to the bulkhead and/or the frame and the other rear end is attached to a structural element, the two rods further apart from the front to the rear, thus providing a work space. Therefore, the rods provide a more comfortable work area while picking up part of the loads from the bulkhead to the floor.

11 Claims, 2 Drawing Sheets

(56) References Cited

U.S. PATENT DOCUMENTS

| | | | |
|---|---|---|---|
| 2006/0006284 A1 | 1/2006 | Vetillard et al. | |
| 2007/0164152 A1* | 7/2007 | Anderson | B64C 1/10 244/118.1 |
| 2008/0149769 A1 | 6/2008 | Koch et al. | |
| 2010/0001134 A1* | 1/2010 | Braeutigam | B64C 1/068 244/119 |
| 2013/0146709 A1 | 6/2013 | Bernadet et al. | |
| 2014/0175223 A1 | 6/2014 | Durand et al. | |
| 2014/0246542 A1* | 9/2014 | Guering | B64C 1/061 244/102 A |

FOREIGN PATENT DOCUMENTS

| | | |
|---|---|---|
| FR | 3000016 | 6/2014 |
| WO | 2013045852 | 4/2013 |

\* cited by examiner

SYSTEM FOR HOLDING A FORWARD PRESSURE BULKHEAD VIA NON-PARALLEL RODS ATTACHED TO THE FLOOR

CROSS-REFERENCES TO RELATED APPLICATIONS

This application claims the benefit of the French patent application No. 1562240 filed on Dec. 11, 2015, the entire disclosures of which are incorporated herein by way of reference.

BACKGROUND OF THE INVENTION

This invention relates to a system for holding a pressure bulkhead and the aircraft provided with such a system.

The nose section of an aircraft fuselage comprises on one hand, a separation bulkhead between a radome which is a non-pressurized space, and on the other, a cockpit and a front technical compartment adjacent to the cockpit and below the latter, which are pressurized spaces. This separation bulkhead is more commonly called the forward pressure bulkhead.

The forward pressure bulkhead providing the separation between the spaces with different pressures is exposed to considerable loads. It is therefore attached directly to the floor in such a way that the floor picks up part of the loads exerted by the pressure bulkhead.

When assembling an aircraft, operatives have to accommodate a large number of equipment units (fittings, cables and pipes) in the volume of the technical compartment: however, the volume of the compartment is encumbered, exiguous and difficult to reach. In effect, the technical compartment contains the nose landing gear bay, which, due to its central position, divides the accessible volume into several distinct work areas, separated one from the other, for the operatives. Furthermore, on account of the size of the majority of aircraft, operatives cannot work in these work areas in a standing position. Finally, as seen above, as the floor is in direct contact with the pressure bulkhead, it is necessary to provide at least one window at floor level for the operative to pass through.

It is therefore difficult to operate in the space of the front technical compartment, and this obliges the operatives to install the different equipment units progressively, unit after unit.

This results in a long and fastidious assembly process.

The aim of the invention is to avoid scattered work areas, to increase their size and to provide a station in a standing position, at the same time ensuring that the loads exerted by the pressure bulkhead are picked up.

SUMMARY OF THE INVENTION

To do this, this invention proposes a nose section of an aircraft in which there is a flat surface forward pressure bulkhead, characterized in that the bulkhead includes at least one transverse frame and in that the nose section includes at least two rods, of which one of the front ends is attached to the bulkhead and/or to the frame and the other rear end is attached to a structural element, the two rods getting further apart from each other when moving from one end to the other end, thus providing a work space.

Therefore, the rods provide a comfortable work area allowing access to a large majority of the equipment units, while picking up part of the loads from the pressure bulkhead to the structural element.

The invention provides at least one of the following optional characteristics, taken in isolation or combined.

The structural element is a floor of the aircraft.

The two rods get further away from each other when moving from the bulkhead toward the structural element.

The bulkhead comprises a central frame and the nose section comprises two central rods of which the front end is attached to the central frame.

The rear end of the rod is attached to a cross member of the floor.

The nose section comprises two lateral boxes on either side of a plane P of global longitudinal symmetry of the aircraft, comprising four sides, one of the sides of the box being adjacent to the bulkhead, another of the sides being adjacent to the structural element, another of the outer sides being adjacent to the aircraft fuselage and another of the inner sides being free.

The nose section comprises two lateral rods of which the front end is attached to two different frames of the bulkhead.

The rear end of the rods is attached respectively to the lateral boxes.

The central rods, being situated on the same side relative to a plane P of global longitudinal symmetry of the aircraft as the lateral rods, are parallel to the lateral rods.

Each rod is doubled.

This invention also relates to the aircraft provided with a nose section as described above.

BRIEF DESCRIPTION OF THE DRAWINGS

Other aims, advantages and characteristics of the invention will appear on reading the description that will follow of the nose section of an aircraft according to the invention, given as a non-limitative example with reference to the attached drawings, in which.

DETAILED DESCRIPTION OF THE PREFERRED EMBODIMENTS

Figure 1:
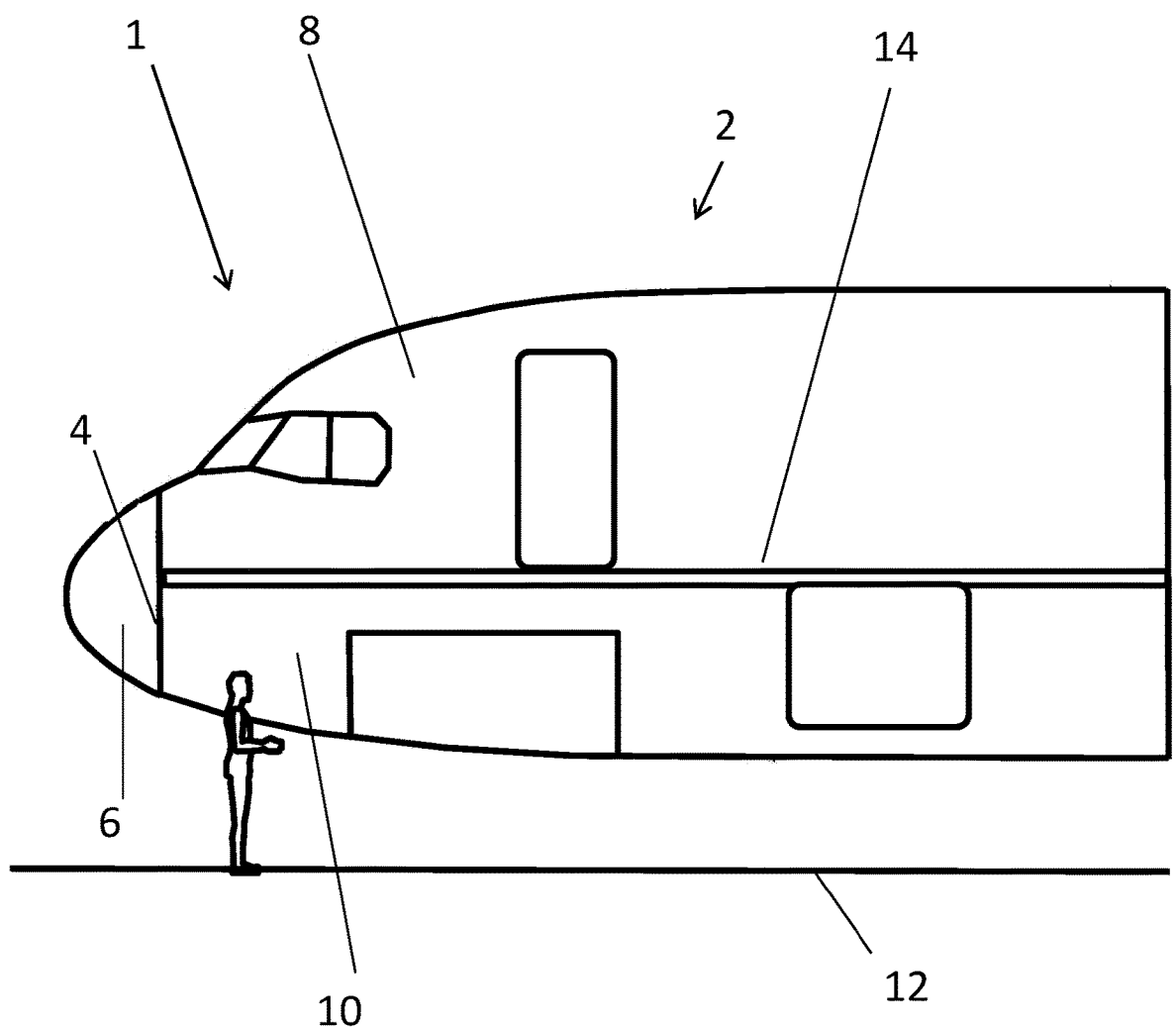
FIG. 1 shows a simplified diagrammatic plan view from the side of the nose section of an aircraft according to this invention, on which an operative appears.

FIG. 1 shows a front part 1 of a nose section of an aircraft 2. The part 1 comprises a forward pressure bulkhead 4. The bulkhead 4 separates a radome 6, which is a non-pressurized space on one hand, from a cockpit 8 and a working technical compartment 10, which are pressurized spaces on the other.

In the embodiment of FIG. 1, the aircraft 2 is assumed to be placed on a ground 12 defining a horizontal plane. The aircraft comprises a floor 14 placed so as to be parallel to the ground 12, namely on a horizontal plane. The floor 14 is a walking floor for the members of the crew (pilot, hostesses etc.) and/or for the passengers. It can be limited to the cockpit floor or be further extended from the cockpit floor at least in part to the cabin floor or any other walking floor. A vertical direction is a direction perpendicular to the horizontal planes of the ground 12 and the floor 14.

The cockpit 8 and the technical compartment 10 are vertically separated by the floor 14. The bulkhead 4 has a flat surface. It is placed along a transverse plane of the aircraft and more precisely in the described embodiment, along a vertical plane, namely a plane perpendicular to the floor 14.

Figure 2:
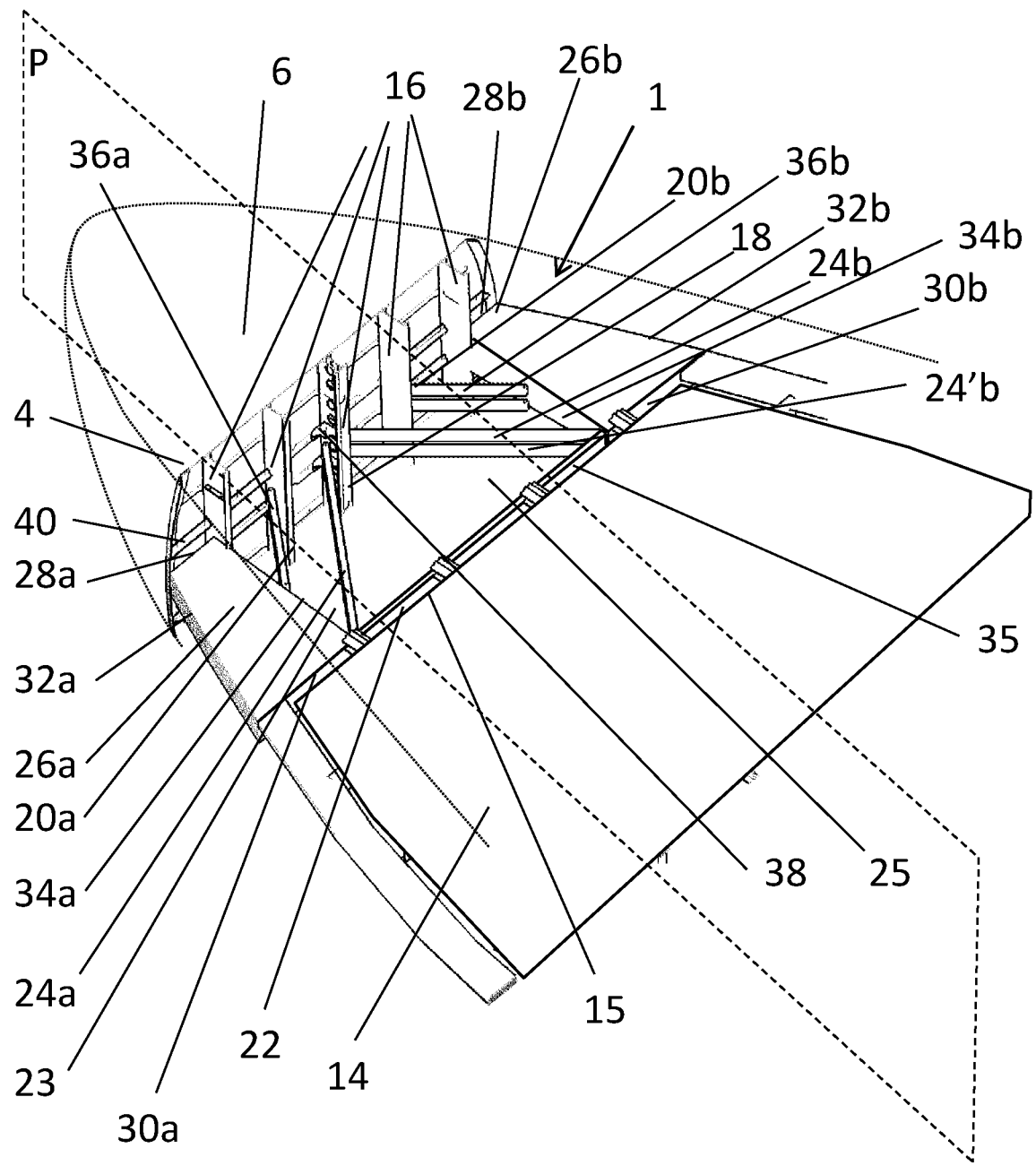
FIG. 2 shows a simplified and partial perspective view of part of a nose section, showing the forward pressure bulkhead and the system for holding the pressure bulkhead according to this invention.

As shown on FIG. 2, the bulkhead 4 has integral or added transverse frames 16. The term transverse is particular to the bulkhead 4. The transverse direction of the bulkhead 4 corresponds to a vertical direction. The frames 16 take the shape of a parallelepiped with a rectangular section in the illustrated embodiment, but could have any other kind of shape that allows what will be described later. In the illustrated embodiment, the frames 16 are beams placed transversally and perpendicular to the vertical side of the bulkhead 4. The frames 16 are parallel to each other. They are spaced from each other. According to a particular embodiment, they are evenly spaced: the distance separating two frames from each other is the same for each pair of adjacent frames.

A frame 18 is provided, placed centrally on the bulkhead 4, namely in a transverse plane of symmetry of the bulkhead 4 and more generally in a vertical, central and longitudinal global plane P of symmetry of the aircraft. The other frames 16 are distributed on either side of the central frame 18. In the illustrated embodiment, at least two other frames 20a, 20b are provided in particular, placed on either side of the frame 18 at an equal distance from it. In the illustrated embodiment, five frames 16 are provided.

The floor 14 longitudinally has two ends, one front end 22 and a rear end not shown. This invention plans to position the front end 22 of the floor at a distance from the bulkhead 4. The bulkhead 4 is therefore no longer attached directly to the floor 14. Hence, a free space 23 is cleared to offer access to the operatives. The surroundings close to the bulkhead 4, which is a zone where a large number of equipment units have to be accommodated, is therefore cleared. Access to the rear of the instrument panels is hence facilitated.

Two central rods 24a and 24b connect the bulkhead 4 to a structural element 15, which is the floor 14 in the illustrated configuration. The rods are placed so as to ensure that part of the loads is picked up from the bulkhead 4 to the structural element 15, namely the floor 14 in the illustrated configuration. The rods are placed in a horizontal plane, in a non-longitudinal direction. They become further apart in this same horizontal plane: they are not parallel.

It may be that the structural element 15 is not part of the floor, that it constitutes an independent element, separate from the floor. The structural element can, for example in other types of configuration, comprise a cross member that does not belong to the floor, or a fitting or other element. In all of the continuation of the description, the structural element 15 will be considered to be the floor 14. Everything described for the floor 14 applies to any structural element 15.

The rods according to this invention trace, in a horizontal plane, diagonals relative to the longitudinal and transverse directions of the aircraft. In the illustrated embodiment, they therefore form, in a horizontal plane, a triangle with the end 22 of the floor. In other embodiments in which the front ends of the rods are distant one relative to the other at the bulkhead, they form a trapezoid with the end 22 of the floor and the bulkhead 4. The inner space of the triangle and of the trapezoid is a work space 25, into which an operative can enter. The work space 25 has a smaller dimension than the free space 23; the free space 23 incorporates the space 25.

The aim of positioning the rods diagonally is to direct the loads from the bulkhead 4 to the lateral zones of the aircraft so as to clear the maximum space and offer a comfortable and central work space 25 so as to reach most of the surrounding equipment units.

The rods are attached so as to be removable. It is therefore possible during the aircraft assembly phase to install the rods after the equipment units: this way, the work space is no longer the space 25 but becomes the free space 23, and its size is further increased.

It is also possible to provide non-removable rods.

One of the front ends of the rods 24 is attached to a frame 16 of the bulkhead 4 so as to ensure, in addition to picking up part of the loads, that the frame 16 in question is held. The frame 16 can be the same or not for each of the rods 24.

In the illustrated embodiment, one of the front ends of the rods 24a and 24b is attached to the same central frame 18, and the other rear end is attached at two points of the end 22 of the floor, the points being transversally distant by any known means. The rods 24a and 24b form an isosceles triangle with the end 22.

The rods 24 are placed in a horizontal plane situated vertically at mid height of the bulkhead 4 so as to optimize picking up the loads. It is possible to position the rods at another vertical level of the bulkhead.

The rods 24 are doubled so as to reinforce safety, designated by the expression "fail safe." This way, if one of the rods breaks or suffers a fault of any nature, the other rod acts as a standby. Thus, on either side of the plane P passing through the central frame 18, there are two rods 24a and 24'a (not shown since underneath and therefore hidden by the rod 24a) on one hand and 24b and 24'b on the other. The rod 24'a, 24'b is situated in the same vertical plane respectively as the rod 24a, 24b, under and parallel to the latter.

Two parallelepiped lateral boxes with a trapezoid shape are provided on either side of the plane P and have a symmetrical shape relative to the plane P. The trapezoid box comprises four sides 28, 30, 32, 34. One of the sides 28a, 28b of the box 26a, 26b forming one of the front bases of the trapezoid is attached to the bulkhead 4. Another of the sides 30a, 30b forming the other rear base is attached to the end 22 of the floor. Another of the outer sides 32a, 32b of the box 26, 28 forming one of the sides of the trapezoid between the bases is placed along the aircraft fuselage. The inner last side 34a, 34b forming the other side between the bases forms a longitudinal side of the opening 23 cleared between the bulkhead and the floor. It is said to be free. The boxes 26a, 26b ensure that the forward lateral shapes of the fuselage are maintained at pressure.

The rear end of the rods 24 joins the intersection between the free inner side 34a, 34b of the box and the end 22 of the floor. In the configuration illustrated on FIG. 2, the rods 24 form an isosceles triangle of which the base is the section of the end 22 of the floor between the lateral boxes 26a, 26b and of which the apex is situated on the central frame 18 and more precisely on either side of it.

This way, the rods 24a and 24b also ensure lateral stabilization of the frame 18.

In the illustrated embodiment, the end 22 of the floor between the lateral boxes 26 consists of a cross member 35 of the floor 14. The loads directed via the rods 24 into the cross member 35 are in opposition to those resulting from the pressure on the lateral sides of the fuselage. Hence the rods 24 allow the loads in the cross beam 35 to be partially relieved, while allowing part of the loads from the bulkhead 4 to be picked up by the rods.

Two lateral rods 36a, 36b are provided between the bulkhead 4 and the floor 14 on either side of the plane P. One of the front ends of each lateral rod 36a, 36b is positioned on two different frames 16 and in the illustrated embodiment, respectively on the frames 20a, 20b. The other rear end of the rods 36a, 36b is attached to a structural element such as the floor or the lateral boxes. In the illustrated embodiment, the other rear end of the rods 36a, 36b is attached respectively to the free inner side 34a, 34b of the lateral box and, for example, midway between the bulkhead 4 and the end 22 of the floor. The lateral rod ensures that other frames are held, and in this case, the frames 20a, 20b, the nearest to the central frame 18, and also ensures with the rods 24 that part of the loads exerted by the bulkhead 4 are picked up.

In the same way as for the rods 24, the rods 36a, 36b are respectively doubled so as to guarantee the "fail safe" aspect.

The rod 36a is parallel to the rod 24a and the rod 36b is parallel to the rod 24b. Since the rods ensuring the fail safe aspect are provided parallel to the rods 24, 36, the set of the rods 24, 36 and standby rods, being on the same side relative to the plane P, are parallel to each other. In contrast, the rod pair 24a, 24'a is not parallel to the rod pair 24b, 24'b. Likewise, the rod pair 36a and standby rod are not parallel to the rod pair 36b and standby rod.

All configurations are possible other than that illustrated in which the effects of central rods 24 are combined with those of lateral rods 36. The central rods 24 could be used without the existence of lateral rods; in this case, it would be possible to widen the lateral boxes. Likewise, it would be possible to consider using lateral rods without central rods, which would make it possible to enlarge the available space between the bulkhead, the lateral rods, the lateral boxes and the floor. It would then be possible if necessary to widen the frames so as to ensure adequate picking up of the loads from the bulkhead 4.

Angle brackets 38 for picking up the rods 24, 36 are provided at the frames 18, 20. The brackets 38 are in the embodiment illustrated in FIG. 2, with a right-angled triangle shape such that each cathetus is positioned on the bulkhead 4 and respectively on the frame 18, 20a, 20b. The end of the rod 24, 36 is attached to the bracket 38 by any known means and for example by a bolt/nut system. Hence, the attachment of the rod to the bulkhead and/or the frame, and in the illustrated embodiment, to the bulkhead and the frame, is removable.

The same type of attachment can be provided at the rear end of the rod, for attaching it to the floor 14.

Horizontal stiffeners 40, namely parallel to the floor 14, are provided on the pressure bulkhead between two adjacent frames 16 or one frame 16 and the lateral end of the bulkhead, namely the aircraft fuselage, at least one of the frames not being stabilized by a rod 24, 36.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nose section of an aircraft, comprising:
a flat surface forward pressure bulkhead between a non-pressurized space and a pressurized space, the bulkhead comprising at least one transverse frame and a planar surface,
at least two rods, each with a front end and a rear end, wherein a front end of a first rod is attached to at least one of the planar surface of the bulkhead or the at least one transverse frame and a rear end of the first rod is attached to a structural element, the two rods getting further apart from each other when moving from front end to the rear end, thus providing a work space,
wherein the structural element is a floor of the aircraft, the floor within an aircraft fuselage above a lowermost portion thereof.

2. The nose section as claimed in claim 1, wherein the the floor of the aircraft is a walking floor for the members of the crew placed so as to be parallel to a ground defining a horizontal plane on which the aircraft is supported.

3. The nose section as claimed in claim 1, wherein the two rods get further away from each other when moving from the planar surface of the bulkhead toward the structural element.

4. The nose section as claimed in claim 1, wherein the at least one transverse frame comprises a central frame and at least two of said at least two rods comprise two central rods, the front end of said rods being attached to at least one of the central frame or to the planar surface of the bulkhead.

5. The nose section as claimed in claim 1, wherein the rear end of the first rod is attached to a cross member of the walking floor.

6. The nose section as claimed in claim 1, further comprising two lateral boxes on either side of a plane of global longitudinal symmetry of the aircraft, each box comprising four sides, one of the sides of the box being adjacent to the planar surface of the bulkhead, another of said sides being adjacent to the structural element, another of said sides being adjacent to the aircraft fuselage and another of said sides being free.

7. The nose section as claimed in claim 1, wherein at least two of said at least two rods comprise two lateral rods of which the front end is attached to at least one of
the planar surface of the bulkhead, or
two different frames of the at least one transverse frame of the bulkhead.

8. The nose section as claimed in claim 1, further comprising
two lateral boxes on either side of a plane of global longitudinal symmetry of the aircraft, each box comprising four sides, one of the sides of the box being adjacent to the bulkhead, another of said sides being adjacent to the structural element, another of said sides being adjacent to the aircraft fuselage and another of said sides being free,
wherein at least two of said at least two rods comprise two lateral rods of which the front end is attached to at least one of
the planar surface of the bulkhead, or
two different frames of the at least one transverse frame of the bulkhead, and
wherein the rear ends of the rods are attached respectively to the lateral boxes.

9. The nose section as claimed in claim 1, wherein
the bulkhead comprises a central frame and at least two of said at least two rods comprise two central rods, the front end of said rods being attached to at least one of the central frame or to the planar surface of the bulkhead, wherein at least two of said at least two rods comprise two lateral rods of which the front end is attached to at least one of the planar surface of the bulkhead, or two different frames of the at least one transverse frame of the bulkhead, and wherein the central rods, being situated on the same side relative to a plane of global longitudinal symmetry of the aircraft as the lateral rods, are parallel to the lateral rods.

10. The nose section as claimed in claim 1, wherein each rod is doubled.

11. An aircraft provided with a nose section comprising:

a flat surface forward pressure bulkhead between a non-pressurized space and a pressurized space, the bulkhead comprising at least one transverse frame and a planar surface, at least two rods, each with a front end and a rear end, of which one of the front ends is attached to at least one of the planar surface of the bulkhead or the frame and the other rear end is attached to a structural element, the two rods getting further apart from each other when moving from one end to the other end, thus providing a work space, wherein the structural element is a floor of the aircraft, the floor within an aircraft fuselage above a lowermost portion thereof.

* * * * *